H. BOARDMAN.
Hub.
No. 27,097.
Patented Feb. 14 1860.
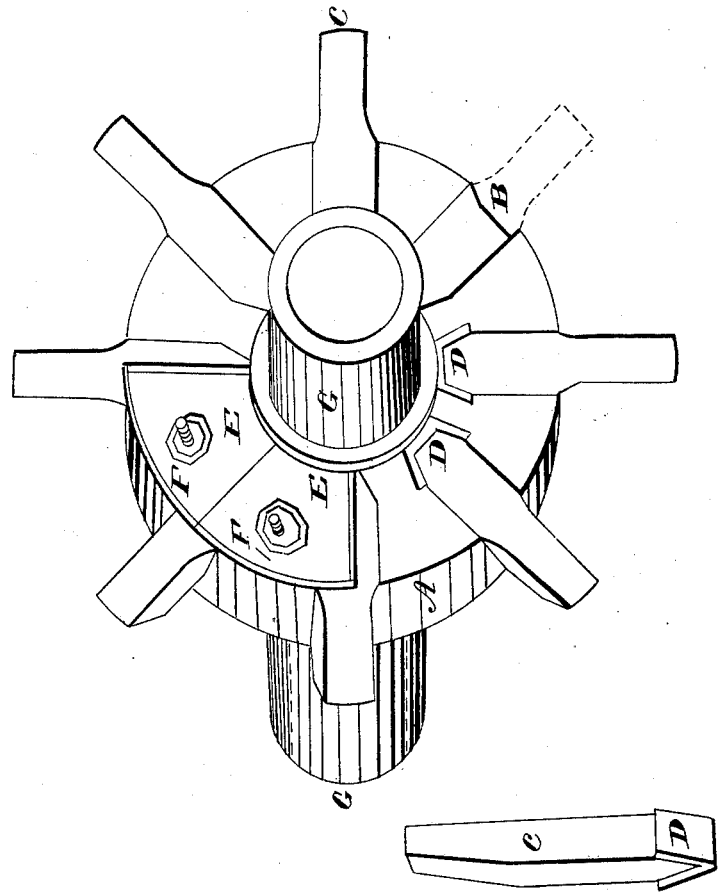
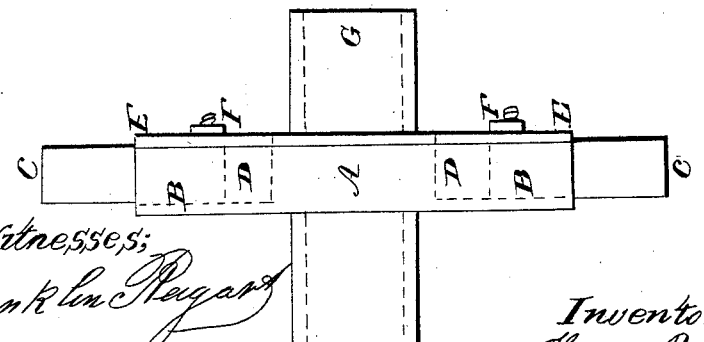
Witnesses:
B Franklin Ragart
W. H. Thackara
Inventor
Harris Boardman

UNITED STATES PATENT OFFICE.

HARRIS BOARDMAN, OF LANCASTER, PENNSYLVANIA.

METALLIC CARRIAGE-HUB.

Specification of Letters Patent No. 27,097, dated February 14, 1860.

*To all whom it may concern:*

Be it known that I, HARRIS BOARDMAN, of Lancaster city, county of Lancaster, and State of Pennsylvania, have invented new and useful Improvements in Hubs for Carriages; and I do hereby declare that the following is a full, clear, and exact description of the construction and operation of the hub, reference being had to the annexed drawings, making a part of this specification, and to the letters of reference marked thereon.

The nature of my invention consists in having a metallic hub with chambers to receive the spokes, and the arrangement of clamp plates, and wedges for tightening the spokes.

To enable others skilled in the art to make and use my invention I will proceed to describe its construction.

A represents the cast iron hub, having grooves or chambers B to receive the spokes C that are inserted and fitted into those chambers or grooves B. The ends of the spokes are beveled off to a point, and when one of the spokes works loose, I insert an angular-shaped wedge D, of metal or other material, at the point of the spoke into the chamber B, which forces out the spoke and tightens it, without interfering with any of the other spokes, and thus the tire is kept tight without being reset, which saves much time and trouble.

E are clamps or metal plates (secured to the hub by screw bolts F) which cover one or more of the spokes, so that a single spoke can be taken out and replaced by a new one, or tightened in its place, without taking the hub or wheel apart, or disturbing any of the other spokes, or removing the tire.

G represents the box or axis of the hub.

I am fully aware that a conical or wedge shaped ring has been used for forcing out and tightening the spokes of metallic hubs. I am also aware that a solid iron flange or collar has been used for securing the spokes to the hub, but these I do not claim. Therefore

What I claim as my invention and desire to secure by Letters Patent is—

The arrangement and combination of the clamp plates E and wedge D as attached to the chambered metallic hub substantially as described, and for the purposes set forth.

HARRIS BOARDMAN.

Witnesses:
 I. FRANKLIN REIGART,
 M. CARPENTER.